United States Patent
Zeulner

(10) Patent No.: US 11,292,200 B2
(45) Date of Patent: Apr. 5, 2022

(54) APPARATUS FOR ADDITIVELY MANUFACTURING AT LEAST ONE THREE-DIMENSIONAL OBJECT

(71) Applicant: CONCEPT LASER GMBH, Lichtenfels (DE)

(72) Inventor: Fabian Zeulner, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 323 days.

(21) Appl. No.: 16/291,088

(22) Filed: Mar. 4, 2019

(65) Prior Publication Data

US 2020/0061926 A1 Feb. 27, 2020

(30) Foreign Application Priority Data

Aug. 24, 2018 (EP) ..................................... 18190815

(51) Int. Cl.
| | | |
|---|---|---|
| *B29C 64/393* | (2017.01) | |
| *B33Y 10/00* | (2015.01) | |
| *B29C 64/153* | (2017.01) | |
| *B22F 10/20* | (2021.01) | |
| *B33Y 30/00* | (2015.01) | |
| *B33Y 50/02* | (2015.01) | |
| *B22F 10/30* | (2021.01) | |

(52) U.S. Cl.
CPC ............ *B29C 64/393* (2017.08); *B22F 10/20* (2021.01); *B29C 64/153* (2017.08); *B33Y 10/00* (2014.12); *B33Y 30/00* (2014.12); *B33Y 50/02* (2014.12); *B22F 10/30* (2021.01)

(58) Field of Classification Search
CPC ... B29C 64/393; B29C 64/153; B29C 64/264; B33Y 10/00; B33Y 30/00; B33Y 50/02; B22F 10/30; Y02P 10/25
USPC ......................................................... 700/117
See application file for complete search history.

(56) References Cited

U.S. PATENT DOCUMENTS

| | | | |
|---|---|---|---|
| 5,001,623 A | 3/1991 | Magid | |
| 2010/0173096 A1* | 7/2010 | Kritchman | B29C 64/112 427/553 |
| 2010/0250973 A1* | 9/2010 | Breen, III | G06F 1/28 713/300 |

(Continued)

FOREIGN PATENT DOCUMENTS

| | | |
|---|---|---|
| CN | 106222085 A | 12/2016 |
| CN | 206048814 U | 3/2017 |

(Continued)

*Primary Examiner* — Michael J Brown
(74) *Attorney, Agent, or Firm* — Dority & Manning, P.A.

(57) ABSTRACT

Apparatus (1) for additively manufacturing at least one three-dimensional object (2) by means of successive layerwise selective consolidation of layers of build material (3), the apparatus (1) comprising a number of functional devices (7-10) operable at a defined operating voltage level, whereby the apparatus (1) comprises at least one voltage control device (13) configured to change the voltage level of a supply voltage (14) supplyable or supplied to the apparatus (1) from an electrical energy supply grid (15) from a supply grid voltage level different from the defined operating voltage level of the number of functional devices (7-10) of the apparatus (1) to the or a voltage level equal to the defined operating voltage level of the number of functional devices (7-10) of the apparatus (1).

20 Claims, 3 Drawing Sheets

(56) References Cited

U.S. PATENT DOCUMENTS

Figure 1:
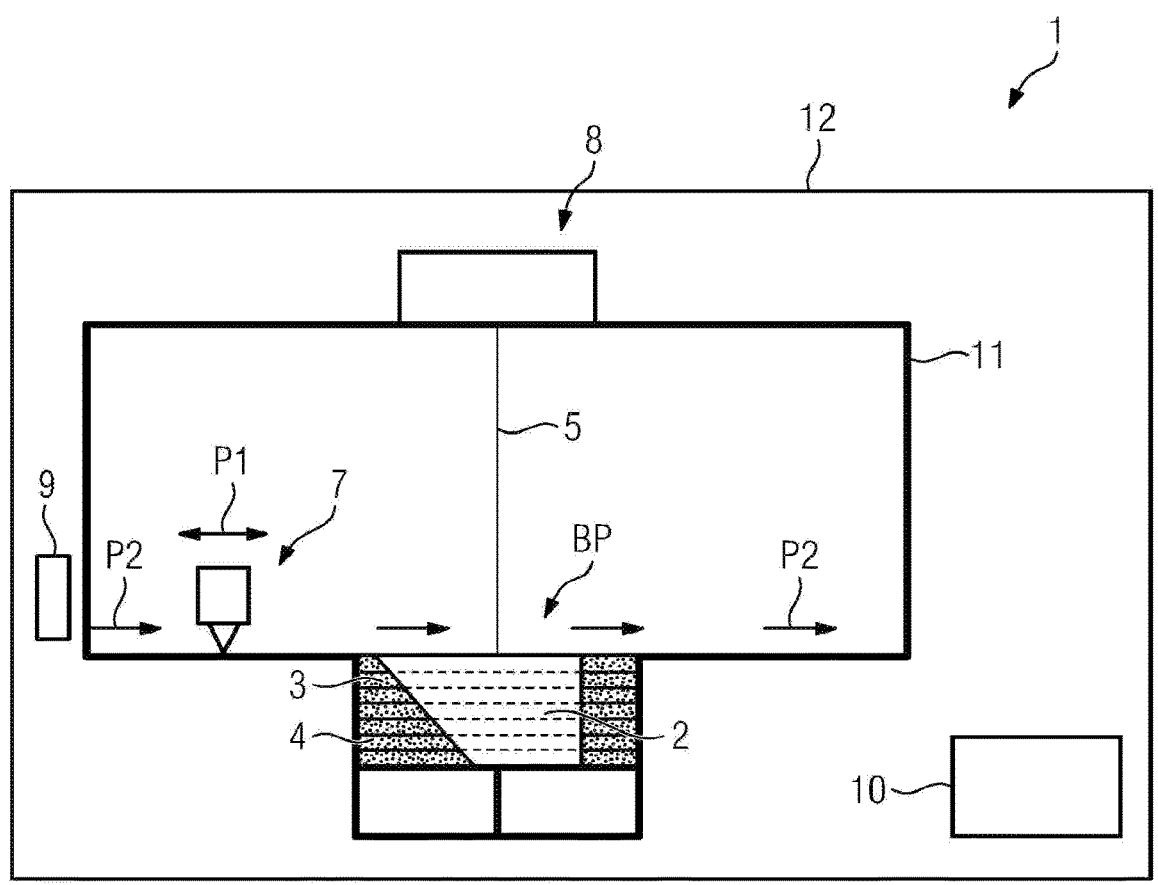

| | | | | |
|---|---|---|---|---|
| 2015/0180360 A1* | 6/2015 | Jung | ................ | H02M 5/04 |
| | | | | 307/31 |
| 2017/0154750 A1 | 6/2017 | Sato | | |
| 2021/0008802 A1* | 1/2021 | Garcia | ................ | B29C 64/393 |

FOREIGN PATENT DOCUMENTS

| | | |
|---|---|---|
| CN | 107099674 B | 6/2018 |
| WO | 2014165735 A1 | 10/2014 |
| WO | 2018010774 A1 | 1/2018 |

* cited by examiner

APPARATUS FOR ADDITIVELY MANUFACTURING AT LEAST ONE THREE-DIMENSIONAL OBJECT

CROSS-REFERENCE TO RELATED APPLICATIONS

This application claims priority to European Patent Application serial no. 18 190 815.3 filed Aug. 24, 2018, the contents of which is incorporated herein by reference in its entirety as if set forth verbatim.

The invention refers to an apparatus for additively manufacturing at least one three-dimensional object by means of successive layerwise selective consolidation of layers of a build material, the apparatus comprising a number of functional devices operable at a defined operating voltage level.

Respective apparatuses for additively manufacturing three-dimensional objects by means of successive layerwise selective irradiation and consolidation of layers of build material are generally known from the technological field of additive manufacturing. Exemplary embodiments of respective apparatuses are selective laser melting apparatuses, selective electron beam apparatuses, or binder jetting apparatuses.

Due to the steady developments of establishing additive manufacturing as a promising alternative for series production of three-dimensional objects, the need for respective apparatuses has been steadily increasing worldwide. Thus, manufacturers of respective additive manufacturing apparatuses offer products on an international market.

Since different countries or regions, respectively use different grid powers the supply voltage supplied from a respective electrical energy supply grid is different in different countries or regions, respectively the manufacturer has to individually configure its apparatuses for different countries or regions, respectively. In particular, the electrical configuration of the functional devices of respective apparatuses has to be adjusted as to comply with the respective supply voltage supplied in the respective country or region, respectively in which the respective apparatus shall be used. As an example, apparatuses and functional devices, respectively manufactured for the European market have to be configured to be operable with a grid voltage of 230 V which is the common grid voltage in Europe, whereas apparatuses and functional devices, respectively manufactured for the US market have to be configured to be operable with a grid voltage of 120 V which is the common grid voltage in the USA.

Individually configuring respective additive manufacturing apparatuses for different countries or regions, respectively obviously represents a state which should be improved at least under a manufacturing engineering aspect.

It is the object of the invention to provide an apparatus for additively manufacturing a three-dimensional object which is improved over known apparatuses for additively manufacturing a three-dimensional object.

This object is achieved by an apparatus according to claim 1. The claims depending on claim 1 relate to possible embodiments of the apparatus according to claim 1.

The apparatus described herein is an apparatus ("additive manufacturing apparatus") for additively manufacturing at least one three-dimensional object, e.g. a technical component, by successive layerwise selective consolidation of build material layers, e.g. ceramic, metal or plastic powders. The additive manufacturing apparatus is particularly adapted for additively manufacturing at least one three-dimensional object by successive layerwise selective irradiation and consolidation of build material layers, whereby each build material layer comprises at least one irradiation area which is to be irradiated and consolidated by means of at least one energy beam. The additive manufacturing apparatus can be embodied as a selective laser sintering apparatus, a selective laser melting apparatus, or a selective electron beam melting apparatus, for instance. Yet, it is also conceivable that the additive manufacturing apparatus is embodied as a binder jetting apparatus, particularly a metal binder jetting apparatus, for instance.

In either case, the additive manufacturing apparatus comprises a number of functional devices which are operable or operated during its operation. Each functional device is operable at a defined operating voltage and operating voltage level, respectively. Each functional device may comprise one or more functional sub-devices operable or operated at a or the respective defined operating voltage and operating voltage level, respectively. Hence, each respective functional device or sub-device can be deemed or denoted as an electrical load which needs to be supplied with electrical power, particularly at a defined operating voltage, for being properly operated.

Exemplary functional devices of the additive manufacturing apparatus are a build material application device which is configured to apply an amount of build material which is to be selectively consolidated in the build plane of the apparatus so as to form a build material layer in the build plane of the additive manufacturing apparatus, an irradiation device which is configured to successively and selectively irradiate and thereby, consolidate build material layers in the build plane with at least one energy beam, e.g. a laser beam or an electron beam, a process gas stream generating device configured to generate a process gas stream being capable of being charged with (dirt or residue) particles generated during consolidation of respective build material layers while streaming across the build plane of the additive manufacturing apparatus, whereby the process gas stream is configured to remove or transport respective (dirt or residue) particles of build material which are generated during selective irradiation and consolidation of the respective build material layer from a process chamber of the additive manufacturing apparatus, and a hardware- and/or software-embodied control device for controlling operation of at least one other functional device of the additive manufacturing apparatus. Other functional devices as the ones mentioned before are conceivable.

The additive manufacturing apparatus comprises at least one voltage control device configured to change, i.e. typically increase or decrease, the voltage level of a supply voltage supplyable or supplied to the additive manufacturing apparatus from an electrical energy supply grid from a supply grid voltage level different from the defined operating voltage level of the number of functional devices of the additive manufacturing apparatus to the defined operating voltage level of the number of functional devices of the additive manufacturing apparatus. Changing the supply voltage by the voltage control device does not mean that the supply voltage as present in the electrical energy supply grid is changed—the operation of the voltage control device thus, has no effect on the electrical energy supply grid—but that the voltage supplied to the additive manufacturing apparatus can be changed in the additive manufacturing apparatus before it reaches the respective functional device of the additive manufacturing apparatus.

As is apparent from above, the at least one voltage control device may thus, be configured to increase or decrease the voltage level of the supply voltage supplied to the additive manufacturing apparatus from an electrical energy supply grid from a voltage level (input voltage level) below or above the defined operating voltage level of the number of functional devices of the additive manufacturing apparatus to a voltage level (output voltage level) equal to the defined operating voltage level of the number of functional devices of the additive manufacturing apparatus. Hence, the input voltage level supplied to the additive manufacturing apparatus from the electrical energy supply grid is not necessarily the input voltage level supplied to a respective functional device from the voltage control device.

The voltage control device can be configured to change the voltage level of a supply voltage supplyable or supplied to the apparatus from an electrical energy supply grid from a supply grid voltage level different from the defined operating voltage level of at least one specific functional device of the apparatus to the or a voltage level equal to the defined operating voltage level of the at least one specific function device of the apparatus. As such, the voltage control device can be configured to change the voltage level of a supply voltage supplyable or supplied to the apparatus from an electrical energy supply grid from a supply grid voltage level different from the defined operating voltage level of an irradiation device of the apparatus to the or a voltage level equal to the defined operating voltage level of the irradiation device of the apparatus. Alternatively or additionally, the voltage control device can be configured to change the voltage level of a supply voltage supplyable or supplied to the apparatus from an electrical energy supply grid from a supply grid voltage level different from the defined operating voltage level of a build material application device of the apparatus to the or a voltage level equal to the defined operating voltage level of the build material application device of the apparatus. Alternatively or additionally, the voltage control device can be configured to change the voltage level of a supply voltage supplyable or supplied to the apparatus from an electrical energy supply grid from a supply grid voltage level different from the defined operating voltage level of a stream generating of the apparatus to the or a voltage level equal to the defined operating voltage level of the stream generating device of the apparatus. Alternatively or additionally, the voltage control device can be configured to change the voltage level of a supply voltage supplyable or supplied to the apparatus from an electrical energy supply grid from a supply grid voltage level different from the defined operating voltage level of a control device of the apparatus to the or a voltage level equal to the defined operating voltage level of the control device of the apparatus.

Changing the voltage level of the supply voltage to the defined operating voltage level of the functional devices of the additive manufacturing apparatus or at least one specific functional device of the additive manufacturing apparatus may be performed in one or more steps. Hence, for the case in which the voltage level of the supply voltage is higher than the voltage level of the defined operating voltage of a respective functional device, the voltage level of the supply voltage may be decreased to a first intermediate voltage level which is lower than the original voltage level of the supply voltage, yet (still) higher than the voltage level of the defined operating voltage. The first intermediate voltage level may be decreased to the voltage level of the defined operating voltage or to a second intermediate voltage level which is lower than the first intermediate voltage level, yet (still) higher than the voltage level of the defined operating voltage. The second intermediate voltage level may be decreased to the voltage level of the defined operating voltage or to a third intermediate voltage level which is lower than the second intermediate voltage level, yet (still) higher than the voltage level of the defined operating voltage and so forth. Likewise, for the case in which the voltage level of the supply voltage is lower than the voltage level of the defined operating voltage, the voltage level of the supply voltage may be increased to a first intermediate voltage level which is higher than the voltage level of the supply voltage, yet (still) lower than the voltage level of the defined operating voltage. The first intermediate voltage level may be increased to the voltage level of the defined operating voltage or to a second intermediate voltage level which is higher than the first intermediate voltage level, yet (still) lower than the voltage level of the defined operating voltage. The second intermediate voltage level may be increased to the voltage level of the defined operating voltage or to a third intermediate which is higher than the second intermediate voltage level, yet (still) lower than the voltage level of the defined operating voltage level and so forth.

The voltage control device is thus, configured to adapt the voltage level of a supply voltage supplyable or supplied to the additive manufacturing apparatus from an electrical energy supply grid from a supply grid voltage level different from the defined operating voltage level of the number of functional devices of the additive manufacturing apparatus to a voltage level equal to the defined operating voltage level of the number of functional devices of the additive manufacturing apparatus.

Hence, the additive manufacturing apparatus can be operated with any supply voltage since any supply voltage can be adapted to the respective operating voltage level required for operating a respective functional device of the additive manufacturing apparatus. Particularly, the additive manufacturing apparatus may be configured in compliance with ISO- and UL-standards which can handle all main supply voltages around the world.

The voltage control device typically comprises electrical circuitry configured to actively change, i.e. actively increase or decrease, an input voltage or an input voltage level, such as the supply voltage or supply voltage level of an electrical energy supply grid, to a defined output voltage or a defined output voltage level, such as the operating voltage or operating voltage level of a respective functional device of the additive manufacturing apparatus.

As mentioned before, the voltage control device is typically configured to actively change, i.e. increase or decrease, an input voltage or an input voltage level, such as the supply voltage or supply voltage level of an electrical energy supply grid, to a defined output voltage or a defined output voltage level, such as the operating voltage or operating voltage level of (a) respective functional device(s) of the additive manufacturing apparatus. The electrical circuitry of the voltage control device may thus, comprise electrical circuitry elements allowing for actively changing an input voltage or input voltage level input into the additive manufacturing apparatus to an output voltage or output voltage level output to the respective functional device(s) of the additive manufacturing apparatus.

The voltage control device may be built as or comprise a motor controller having an active power supply for supplying an output voltage to a functional device assigned, i.e. particularly electrically connected, thereto, for instance.

Hence, an improved additive manufacturing apparatus is given. The improvement is particularly based on the fact that the additive manufacturing apparatus is ready to be used with any supply voltage, i.e. at any location in the world, since the supply voltage level can, if need be, changed to the respective operating voltage level of the respective functional device(s) of the additive manufacturing apparatus.

The voltage control device is typically disposed at or in a housing structure of the additive manufacturing apparatus. The voltage control device may thus, be deemed a structural member of the additive manufacturing apparatus.

The voltage control device may be assigned to a supply voltage input device, e.g. an electrical socket, of the additive manufacturing apparatus or a respective functional device thereof, respectively.

The or at least one voltage control device may be arrangeable or arranged between a supply voltage output device, e.g. an electrical socket of an electrical installation of a manufacturing site, and a supply voltage input device, e.g. an electrical socket, of the additive manufacturing apparatus or a respective functional device thereof, respectively so as to concertedly adapt the voltage level of the supply voltage input to the apparatus from an electrical energy supply grid from the supply voltage level to the defined operating voltage level of a respective functional device of the additive manufacturing apparatus. As mentioned before, the voltage control device may thus, be assigned to a supply voltage input device, e.g. an electrical socket, of the additive manufacturing apparatus or a respective functional device thereof.

The or at least one control device may also be arrangeable or arranged downstream of a supply voltage input device, particularly an electrical input socket, of the apparatus or at least one respective functional device thereof.

The at least one voltage control device may be configured to transform the voltage level of a supply voltage supplyable or supplied from an electrical energy supply grid to the defined operating voltage level of the number of functional devices of the additive manufacturing apparatus. The at least one voltage control device may be particularly configured to transform the voltage level supplyable or supplied from an electrical energy supply grid to a constant voltage corresponding to the defined operating voltage level of the number of functional devices of the additive manufacturing apparatus. In other words, the voltage control device may be particularly built as or comprise at least one electrical device that is configured to transform an input voltage or input voltage level in an (constant) output voltage or in an (constant) output voltage level. A respective electrical device may be or comprise an electrical transformer, for instance. A respective electrical device and transformer, respectively is particularly configured to actively change, i.e. increase or decrease, an input voltage or an input voltage level, such as the supply voltage or supply voltage level of an electrical energy supply grid, to a defined output voltage or a defined output voltage level, such as the operating voltage or operating voltage level of a respective functional device of the additive manufacturing apparatus.

The apparatus may comprise a hardware- and/or software-embodied input voltage level determination unit configured to determine the voltage level of an input voltage input into the voltage control device. The input voltage level determination unit may be configured to generate an input voltage information which indicates the input voltage or input voltage level input into the voltage control device. This information can be used to control operation of the voltage control device. The input voltage determination unit may thus, be assigned to the voltage control device. The input voltage determination unit may, particularly form part of the voltage control device.

The apparatus may comprise a hardware- and/or software-embodied output voltage level determination unit configured to determine the voltage level of an output voltage output from the voltage control device. The output voltage level determination unit may be configured to generate an output voltage information which indicates the output voltage or output voltage level of the voltage control device. This output voltage information can be used to control operation of the voltage control device. The output voltage determination unit may thus, be assigned to the voltage control device. The output voltage determination unit may, particularly form part of the voltage control device.

Generally, the at least one voltage control device may be configured to communicate or may communicate with a control unit of at least one functional device of the additive manufacturing apparatus, the control unit being configured to control operation of the at least one functional device of the additive manufacturing apparatus. The control unit may be embodied as a superordinate control unit of the additive manufacturing apparatus which is configured to control operation of a plurality of functional devices of the additive manufacturing apparatus. The communication can improve operational stability of the respective functional device(s) since operation of the functional device(s) may be controlled on basis of the communication between the voltage control device and the respective functional device(s). If the communication indicates proper operation of the voltage control device, the respective functional device(s) may be operated or operated with a first operational parameter set. If the communication does not indicate proper operation of the voltage control device, the respective functional device(s) may not be operated or operated with a further set of operational parameters.

The voltage control device may be configured to change the voltage level of a supply voltage supplied to the additive manufacturing apparatus from an electrical energy supply grid from a voltage different from the defined operating voltage of the functional devices of the additive manufacturing apparatus to at least two different output voltages or output voltage levels. In other words, the voltage control device may output at least two different output voltages or at least two different output voltage levels. This can be of advantage if the additive manufacturing apparatus comprises a number of first functional devices operable at a first defined operating voltage and a number of second or further functional devices operable at a second or further defined operating voltage different from the first operating voltage or first operating voltage level. In this case, the voltage control device can be configured to change the voltage of a supply voltage supplyable or supplied to the additive manufacturing apparatus from an electrical energy supply grid from a voltage different from the defined operating voltage of the number of functional devices of the additive manufacturing apparatus to a voltage equal to the first defined operating voltage of the first functional devices of the additive manufacturing apparatus and to a voltage level equal to the second or further defined operating voltage of the second of further functional devices of the additive manufacturing apparatus. As mentioned above, the voltage control device can be configured to change the voltage level of a supply voltage supplyable or supplied to the apparatus from an electrical energy supply grid from a supply grid voltage level different from the defined operating voltage level of at least one specific functional device of the apparatus to the or a voltage level equal to the defined operating voltage level of the at least one specific function device of the apparatus.

Likewise, the additive manufacturing apparatus may comprise at least two voltage control devices, whereby a first voltage control device is configured to change the voltage level of a supply voltage supplyable or supplied to the additive manufacturing apparatus from an electrical energy supply grid from a voltage level different from the defined operating voltage level of the number of functional devices of the additive manufacturing apparatus to a voltage equal to the first defined operating voltage level of the first functional devices of the additive manufacturing apparatus, and a second or further voltage control device configured to change the voltage level of a supply voltage supplyable or supplied to the additive manufacturing apparatus from an electrical energy supply grid from a voltage level different from the defined operating voltage level of the number of functional devices of the additive manufacturing apparatus to a voltage level equal to the second or further defined operating voltage level of the second or further functional devices of the additive manufacturing apparatus.

The additive manufacturing apparatus may also comprise a plurality of voltage control devices, whereby each voltage control device is assignable or assigned to a specific functional device of the additive manufacturing apparatus. Hence, each functional device may comprise its own voltage control device.

Generally, providing more than one respective voltage control device may also increase operational safety due to redundancy.

The invention further refers to a voltage control device for an additive manufacturing apparatus comprising a number of functional devices operable at a defined operating voltage level. The voltage control device is configured to change the voltage level of a supply voltage supplyable or supplied to the additive manufacturing apparatus from an electrical energy supply grid from a supply grid voltage level different from the defined operating voltage level of the number of functional devices of the additive manufacturing apparatus to a voltage level equal to the defined operating voltage level of the number of functional devices of the apparatus. All annotations concerning the additive manufacturing apparatus also apply to the voltage control device.

The invention also refers to a method for operating an additive manufacturing apparatus for additively manufacturing at least one three-dimensional object by means of successive layerwise selective consolidation of layers of build material, the additive manufacturing apparatus comprising a number of functional devices operable at a defined operating voltage level. The method comprises (actively) changing the voltage level of a supply voltage supplied to the additive manufacturing apparatus from an electrical energy supply grid from a supply grid voltage level different from the defined operating voltage level of the number of functional devices of the additive manufacturing apparatus to a voltage level equal to the defined operating voltage level of the number of functional devices of the additive manufacturing apparatus by at least one voltage control device of the additive manufacturing apparatus. All annotations concerning the additive manufacturing apparatus also apply to the method.

Figure 2:
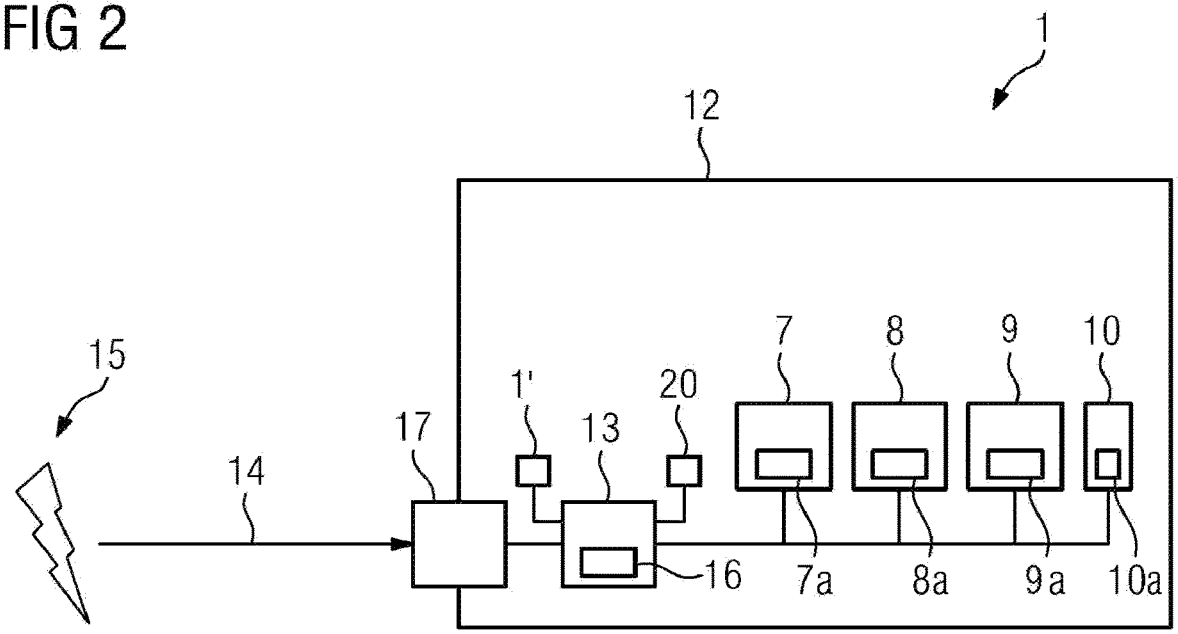
Figure 3:
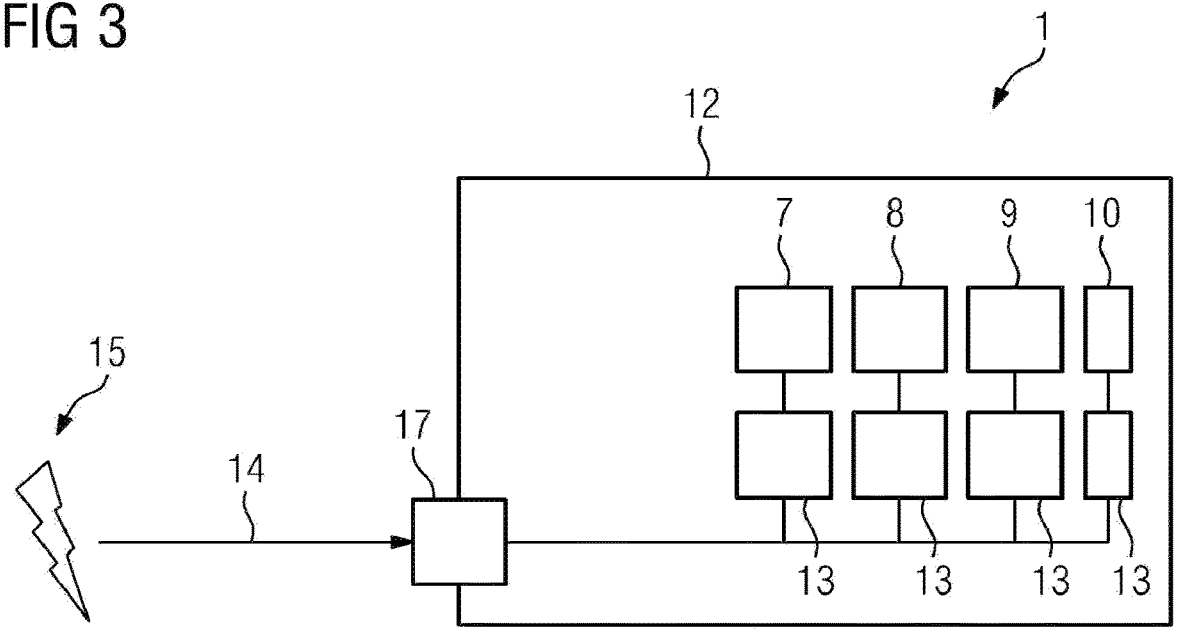
Figure 4:
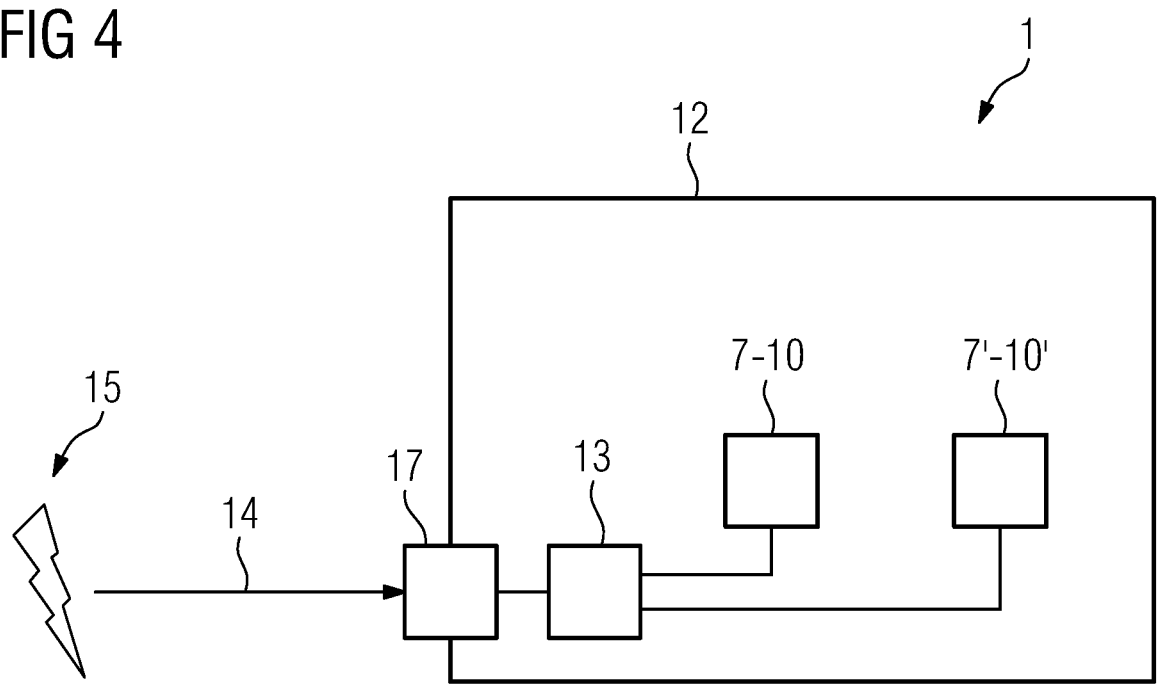

Exemplary embodiments of the invention are described with reference to the Fig., whereby:

FIG. 1 shows a principle drawing of an apparatus for additively manufacturing at least one three-dimensional object according to an exemplary embodiment; and FIG. 2-4 each show a principle drawing of an additive manufacturing apparatus according to further exemplary embodiments.

FIG. 1 shows a principle drawing of an exemplary embodiment of an apparatus 1 for additively manufacturing at least one three-dimensional object 2, e.g. a technical component, by means of successive layerwise selective consolidation of build material layers 3 of a powdered build material 4, e.g. a metal powder, which can be consolidated by means of at least one energy beam 5 according to an exemplary embodiment. The energy beam 5 may be an electron beam or a laser beam, for instance. The apparatus 1 may thus, be embodied as a selective electron beam melting apparatus or as a selective laser melting apparatus, for instance. Yet, it is also possible that the apparatus 1 is embodied as a binder jetting apparatus, particularly a metal binder jetting apparatus.

The apparatus 1 comprises a number of functional devices 7-10 which are operable and operated during its operation arranged at or in a(n outer) housing structure 12 of the apparatus 1. Each functional device 7-10 may comprise a number of functional sub-devices. Operation of the functional devices 7-10 and the apparatus 1, respectively is controlled by a hard- and/or software embodied (central) control device 10. The control device 10 can also be deemed as a functional device of the apparatus 1.

Exemplary functional devices 7-10 of the apparatus 1 are a build material application device 7, an irradiation device 8, a process gas stream generating device 9, and a hardware- and/or software-embodied control device 10.

The build material application device 7 is configured to apply an amount of build material 3 in the build plane BP of the apparatus 1 so as to generate respective layers of build material 3 which are to be selectively consolidated during additively manufacturing a three-dimensional object 2 by means of the apparatus 1. The build material application device 7 may be embodied as a re-coating device, for instance. The build material application device 7 is moveably supported within the process chamber 11 of the apparatus 1. As indicated by double-arrow P1, the build material application device 7 may be moved across the build plane BP of the apparatus 1 so as to apply an amount of dosed build material 3 in the build plane BP of the apparatus 1 and generate a respective build material layer which is to be selectively consolidated during additively manufacturing a three-dimensional object 2 by means of the apparatus 1. As mentioned before, an exemplary motion of the build material application device 7 is indicated by arrow P1, which may represent an exemplary build material application direction of the build material application device 7.

The irradiation device 8 is configured to selectively irradiate and thereby, consolidate respective build material layers which have been applied in the build plane BP of the apparatus 1 by the build material application device 7 with at least one energy beam 5. The irradiation device 8 may comprise a beam generating device (not shown) configured to generate at least one energy beam 5 and a beam deflecting device (not shown), e.g. a scanning device, configured to deflect an energy beam 5 to diverse positions within the build plane BP of the apparatus 1.

The process gas stream generating device 9 is configured to generate a process gas stream, e.g. an inert gas stream, as indicated by arrows P2 being capable of being charged with (dirt or residue) particles generated during consolidation of respective build material layers while streaming across the build plane BP of the apparatus 1, whereby the process gas stream is configured to remove or transport respective (dirt or residue) particles of build material 3 which are generated during selective consolidation of respective build material layers from the process chamber 11 of the apparatus 1. The process gas stream typically enters the process chamber 11 at a process chamber inlet and exits the process chamber at process chamber outlet. Both the process chamber inlet and the process chamber outlet are provided at a wall element of the process chamber 11.

Notably, each of the functional devices 7-10 of the apparatus 1 is operable at a defined operating voltage level. The voltage levels of single, multiple, or all functional devices 7-10 of the apparatus 1 can be the same.

FIG. 2-4 each shows a principle drawing of an exemplary embodiment of an apparatus 1 for additively manufacturing at least one three-dimensional object 2. The apparatus 1 of FIG. 2-4 could be the apparatus 1 of FIG. 1 with further features which will be described in the following:

The apparatus 1 comprises of FIG. 2 comprises a voltage control device 13 configured to change, i.e. typically increase or decrease, the voltage level of a supply voltage 14 supplyable or supplied to the apparatus 1 from an electrical energy supply grid 15 from a supply grid voltage level different from the defined operating voltage level of the functional devices 7-10 of the apparatus 1 to the defined operating voltage level of the functional devices 7-10 of the apparatus 1. Changing the supply voltage 14 by the voltage control device 13 does not mean that the supply voltage 14 as present in the electrical energy supply 15 grid is changed—the operation of the voltage control device 13 thus, has no effect on the electrical energy supply grid 15—but that the voltage supplied to the apparatus 1 can be changed in the apparatus 1 before it reaches the respective functional device 7-10 of the apparatus 1.

The voltage control device 13 is thus, configured to increase or decrease the voltage level of the supply voltage 14 supplied to the apparatus 1 from the electrical energy supply grid 15 from a voltage level (input voltage level) below or above the defined operating voltage level of the functional devices 7-10 of the apparatus 1 to a voltage level (output voltage level) equal to the defined operating voltage level of the functional devices 7-10 of the apparatus 1. Hence, the input voltage level supplied to the apparatus 1 from the electrical energy supply grid 15 is not necessarily the input voltage level supplied to a respective functional device 7-10 from the voltage control device 13.

The voltage control device 13 is thus, configured to adapt the voltage level of the supply voltage 14 supplyable or supplied to the apparatus 1 from the electrical energy supply grid 15 from a supply grid voltage level different from the defined operating voltage level of the functional devices 7-10 of the apparatus 1 to a voltage level equal to the defined operating voltage level of the functional devices 7-10 of the apparatus 1.

Hence, the apparatus 1 can be operated with any supply voltage 14 since any supply voltage 14 can be adapted to the respective operating voltage level required for operating the functional devices 7-10 of the apparatus 1. Particularly, the apparatus 1 may be configured in compliance with ISO- and UL-standards which can handle all main supply voltages 14 around the world. The apparatus 1 is ready to be used with any supply voltage 14, i.e. at any location in the world, since the supply voltage level can, if need be, changed to the respective operating voltage level of the functional devices 7-10 of the apparatus 1.

The voltage control device 13 typically comprises electrical circuitry 16 configured to actively change, i.e. actively increase or decrease, an input voltage or an input voltage level, such as the supply voltage 14 of an electrical energy supply grid 15, to a defined output voltage or a defined output voltage level, such as the operating voltage or operating voltage level of the respective functional devices 7-10 of the apparatus 1.

The voltage control device 13 is thus, configured to actively change, i.e. increase or decrease, an input voltage or an input voltage level, such as the supply voltage 14 or supply voltage level of the electrical energy supply grid 15, to a defined output voltage or a defined output voltage level, such as the operating voltage or operating voltage level of a respective functional device 7-10 of the apparatus 1. The electrical circuitry 16 of the voltage control device 13 thus, comprises electrical circuitry elements (not shown) allowing for actively changing an input voltage or input voltage level input into the apparatus 1 to an output voltage or output voltage level output to the respective functional devices 7-10 of the apparatus 1.

The voltage control device 13 may be configured to transform the voltage level of the supply voltage 14 supplied from the electrical energy supply grid 15 to the defined operating voltage level of the functional devices 7-10 of the apparatus 1. The voltage control device 13 may be particularly configured to transform the voltage level supplyable or supplied from the electrical energy supply grid 15 to a constant voltage corresponding to the defined operating voltage level of the functional devices 7-10 of the apparatus 1. In other words, the voltage control device 13 may be built as or comprise at least one electrical device that is configured to transform an input voltage or input voltage level in an (constant) output voltage or in an (constant) output voltage level. A respective electrical device may be or comprise an electrical transformer, for instance.

The voltage control device 13 may be built as or comprise a motor controller having an active power supply for supplying an output voltage to a functional device 7-10 assigned, i.e. particularly electrically connected, thereto, for instance.

As is apparent from FIG. 2-4, the voltage control device 13 can be disposed in the housing structure 12 of the apparatus 1. The voltage control device 13 may thus, be deemed a structural member of the apparatus 1.

As is also apparent from FIG. 2-4, the voltage control device 13 may be assigned to a supply voltage input device 17, e.g. an electrical socket, of the apparatus 1 or a respective functional device thereof, respectively.

As is apparent from the FIG. 2-4, the voltage control device 13 may be disposed downstream of the supply voltage input device 17, particularly an electrical input socket, of the apparatus or at least one respective functional device thereof. Yet, the voltage control device 13 may also be disposed between the supply voltage output device, e.g. an electrical socket of an electrical installation of a manufacturing site (not shown), and the supply voltage input device 17 of the apparatus 1 or a respective functional device thereof, respectively so as to concertedly adapt the voltage level of the supply voltage 14 input to the apparatus 1 from the electrical energy supply grid 15 from the supply voltage level to the defined operating voltage level of the functional devices 7-10 of the apparatus 1.

FIG. 2-4 further show an optional hardware- and/or software-embodied input voltage level determination unit 19 configured to determine the voltage level of an input voltage input into the voltage control device 13. The input voltage level determination unit 19 may be configured to generate an input voltage information which indicates the input voltage or input voltage level input into the voltage control device 13. This information can be used to control operation of the voltage control device 13. The input voltage determination unit 19 may thus, be assigned to the voltage control device 13. The input voltage determination unit 19 may form part of the voltage control device 13.

FIG. 2-4 further show an optional hardware- and/or software-embodied output voltage level determination unit 20 configured to determine the voltage level of an output voltage output from the voltage control device 13. The output voltage level determination 20 unit may be configured to generate an output voltage information which indicates the output voltage or output voltage level of the voltage control device 13. This output voltage information can be used to control operation of the voltage control device 13. The output voltage determination unit 20 may thus, be assigned to the voltage control device 13. The output voltage determination unit 20 may form part of the voltage control device 13.

The voltage control device 13 may be configured to communicate or may communicate with a control unit 7a-10a of at least one functional device 7-10 of the apparatus 1, the control unit 7a-10a being configured to control operation of the respective functional device 7-10 of the apparatus 1. The control unit may also be embodied as the superordinate control unit 10 of the apparatus 1 which is configured to control operation of the functional devices 7-10 of the apparatus 1. The communication can improve operational stability of the functional devices 7-10 since operation of the functional devices 7-10 may be controlled on basis of the communication between the voltage control device 13 and the respective functional device 7-10. If the communication indicates proper operation of the voltage control device 13, the respective functional device 7-10 may be operated or operated with a first operational parameter set. If the communication does not indicate proper operation of the voltage control device 13, the respective functional device 7-10 may not be operated or operated with a further set of operational parameters.

FIG. 3 shows an exemplary embodiment in which the apparatus 1 comprises a plurality of voltage control devices 13. Each voltage control device 13 is assigned to a specific functional device 7-10 of the apparatus 1.

FIG. 4 shows an exemplary embodiment in which a voltage control device 13 is configured to change the voltage level of a supply voltage 14 supplied to the apparatus 1 from an electrical energy supply grid 15 from a voltage different from the defined operating voltage of respective functional devices 7-10 of the apparatus 1 to at least two different output voltages or output voltage levels. In other words, the voltage control device 13 may output at least two different output voltages or at least two different output voltage levels. This can be of advantage if the apparatus 1 comprises a number of first functional devices 7-10 operable at a first defined operating voltage and a number of second or further functional devices 7'-10' operable at a second or further defined operating voltage different from the first operating voltage or first operating voltage level. The voltage control device 13 is configured to change the voltage of the supply voltage 14 supplyable or supplied to the apparatus 1 from the electrical energy supply grid 15 from a voltage different from the defined operating voltage of the number of functional devices 7-10, 7'-10' of the apparatus 1 to a voltage equal to the first defined operating voltage of the first functional devices 7-10 of the apparatus 1 and to a voltage level equal to the second or further defined operating voltage of the second of further functional devices 7'-10' of the apparatus 1.

Likewise, the additive manufacturing apparatus 1 could comprise at least two voltage control devices 13, whereby a first voltage control device 13 is configured to change the voltage level of a supply voltage 14 supplyable or supplied to the apparatus 1 from an electrical energy supply grid 15 from a voltage level different from the defined operating voltage level of the functional devices 7-10 of the apparatus 1 to a voltage equal to the first defined operating voltage level of the first functional devices 7-10 of the apparatus 1, and a second or further voltage control device 13 is configured to change the voltage level of a supply voltage 14 supplyable or supplied to the apparatus 1 from the electrical energy supply grid 15 from a voltage level different from the defined operating voltage level of the functional devices 7-10 of the apparatus 1 to a voltage level equal to the second or further defined operating voltage level of the second or further functional devices 7'-10' of the apparatus 1.

In any case, i.e. this applies for all embodiments, changing the voltage level of the supply voltage 14 to the defined operating voltage level of the functional devices 7-10 of the apparatus 1 may be performed in one or more steps.

The apparatus 1 of FIG. 1-4 each allow for implementing a method for operating a respective apparatus 1. The method comprises (actively) changing the voltage level of a supply voltage 14 supplied to the apparatus 1 from an electrical energy supply grid 15 from a supply grid voltage level different from the defined operating voltage level of the number of functional devices 7-10 of the apparatus 1 to a voltage level equal to the defined operating voltage level of the number of functional devices 7-10 of the apparatus 1 by at least one voltage control device 13 of the apparatus 1.

All exemplary embodiments may be arbitrarily combined with each other. Particularly, single, a plurality, or all features mentioned in context with a specific embodiment may also apply to other embodiments. Hence, mentioned in context with a specific embodiment may be combined with at least one feature of another specific embodiment.

The invention claimed is:

1. An apparatus for additively manufacturing at least one three-dimensional object by successive layerwise selective consolidation of layers of build material, the apparatus comprising:
   a plurality of functional devices, the plurality of functional devices comprising:
      at least one first functional device operable at a first defined operating voltage level; and
      at least one second functional device operable at a second defined operating voltage level; and
   at least one voltage control device configured to change a voltage level from a supply voltage level supplied or supplyable from an electrical energy grid to:
      the first defined operating voltage level of the at least one first functional device; and
      the second defined operating voltage level of the at least one second functional device.

2. The apparatus according to claim 1, wherein the at least one voltage control device comprises at least one electrical transformer.

3. The apparatus according to claim 1, wherein the supply voltage level is lower than at least one of the first or second defined operating voltage levels, and wherein the at least one voltage control device is configured to increase the voltage level from the supply voltage level to the at least one of the first or second defined operating voltage levels.

4. The apparatus according to claim 1, wherein the supply voltage level is higher than at least one of the first or second defined operating voltage levels, and wherein the at least one voltage control device is configured to decrease the voltage level from the supply voltage level to the at least one of the first or second defined operating voltage levels.

5. The apparatus according to claim 1, wherein the at least one voltage control device is arrangeable or arranged between an electrical output socket of an electrical installation of a manufacturing site and an electrical input socket of the apparatus or at least one respective functional device thereof.

6. The apparatus according to claim 1, wherein the at least one voltage control device is arrangeable or arranged downstream of a supply voltage input device of the apparatus or at least one of the plurality of functional devices.

7. The apparatus according to claim 1, wherein the at least one voltage control device is disposed inside a housing structure of the apparatus.

8. The apparatus according to claim 1, further comprising an input voltage level determination unit configured to determine the supply voltage level.

9. The apparatus according to claim 8, further comprising an output voltage level determination unit configured to determine an output voltage level of a voltage output from the at least one voltage control device.

10. The apparatus according to claim 1, wherein the at least one voltage control device is further configured to change the voltage level from the supply voltage level to a defined operating voltage level of a build material application device of the apparatus.

11. The apparatus according to claim 1, wherein the at least one voltage control device is further configured to change the voltage level from the supply voltage level to a defined operating voltage level of an irradiation device of the apparatus.

12. The apparatus according to claim 1, wherein the at least one voltage control device is further configured to change the voltage level from the supply voltage level to a defined operating voltage level of a stream generating device of the apparatus.

13. The apparatus according to claim 1, wherein the at least one voltage control device is further configured to change the voltage level from the supply voltage level to a defined operating voltage level a defined operating voltage level of the at least one voltage control device.

14. The apparatus according to claim 1, wherein a voltage control device of the at least one voltage control device is configured to change the voltage level from the supply voltage level to the first defined operating voltage of the at least one first functional device and to the second defined operating voltage of the at least one second functional device.

15. The apparatus according to claim 1, further comprising:
a first voltage control device configured to change the voltage level from the supply voltage level to the first defined operating voltage of the at least one first functional device; and
a second voltage control device configured to change the voltage level from the supply voltage level to the second defined operating voltage of the at least one second functional device.

16. A method for operating an apparatus for additively manufacturing at least one three-dimensional object by successive layerwise selective consolidation of layers of build material, the method comprising:
supplying, from an electrical energy supply grid, a supply voltage having a supply voltage level to the apparatus;
changing, with at least one voltage control device, the supply voltage level to a first defined operating voltage level of at least one first functional device;
changing, with at least one voltage control device, the supply voltage level to a second defined operating voltage level of at least one second functional device; and
operating the at least one first and second functional devices at the respective first and second defined operating voltage levels.

17. The method according to claim 16, wherein the at least one voltage control device comprises at least one electrical transformer.

18. The apparatus according to claim 16, further comprising:
increasing, with the at least one voltage control device, the supply voltage level to the at least one of the first or second defined operating voltage levels.

19. The apparatus according to claim 16, further comprising:
decreasing, with the at least one voltage control device, the supply voltage level to at least one of the first or second defined operating voltage levels.

20. The apparatus according to claim 16, further comprising:
changing, with a first voltage control device, the supply voltage level to the first defined operating voltage of the at least one first functional device; and
changing, with a second voltage control device, the supply voltage level to the second defined operating voltage of the at least one second functional device.

* * * * *